United States Patent
Jahaber

(10) Patent No.: US 11,873,251 B1
(45) Date of Patent: Jan. 16, 2024

(54) CONCRETE COMPOSITION FOR USE IN CONSTRUCTION AND METHODS OF APPLYING THE SAME

(71) Applicant: Onx, Inc, Carrollton, TX (US)

(72) Inventor: Mohamed Kassim Jahaber, Dubai (AE)

(73) Assignee: ONX, INC., Carrollton, TX (US)

( * ) Notice: Subject to any disclaimer, the term of this patent is extended or adjusted under 35 U.S.C. 154(b) by 0 days.

(21) Appl. No.: 18/111,265

(22) Filed: Feb. 17, 2023

(51) Int. Cl.
| | | |
|---|---|---|
| *C04B 28/14* | (2006.01) | |
| *C04B 14/06* | (2006.01) | |
| *C04B 16/06* | (2006.01) | |
| *C04B 103/20* | (2006.01) | |
| *C04B 111/10* | (2006.01) | |
| *C04B 103/32* | (2006.01) | |

(52) U.S. Cl.
CPC ............. *C04B 28/14* (2013.01); *C04B 14/06* (2013.01); *C04B 16/0633* (2013.01); *C04B 2103/20* (2013.01); *C04B 2103/32* (2013.01); *C04B 2111/1037* (2013.01); *C04B 2201/32* (2013.01); *C04B 2201/50* (2013.01)

(58) Field of Classification Search
CPC ..... C04B 28/14; C04B 14/06; C04B 16/0633; C04B 2103/20; C04B 2103/32; C04B 2111/1037; C04B 2201/32; C04B 2201/50
See application file for complete search history.

(56) References Cited

U.S. PATENT DOCUMENTS

| | | |
|---|---|---|
| 3,265,826 A | 8/1966 | Autry et al. |
| 3,313,073 A | 4/1967 | Mathews |
| 3,460,281 A | 8/1969 | Levy |
| 3,765,543 A | 10/1973 | Thomas |
| 3,974,607 A | 8/1976 | Balinki |
| 3,992,839 A | 11/1976 | LaBorde |
| 4,285,184 A | 8/1981 | Turner, Jr. |
| 5,040,345 A | 8/1991 | Gilmour |
| 5,313,752 A | 5/1994 | Hatzinikolas |
| 5,559,311 A | 9/1996 | Gorbatoff |
| 5,685,113 A | 11/1997 | Reuter |
| 5,689,922 A | 11/1997 | Daudet |
| 5,706,620 A | 1/1998 | DeZen |
| 5,996,296 A | 12/1999 | Bisbee |
| 6,015,026 A | 1/2000 | McGrath |
| 6,118,676 A | 9/2000 | Divan |
| 6,122,867 A | 9/2000 | Leconte |
| 6,189,269 B1 | 2/2001 | DeZen |
| 6,371,637 B1 | 4/2002 | Atchinson |
| 6,426,632 B1 | 7/2002 | Clunn |
| 6,430,881 B1 | 8/2002 | Daudet |
| 6,647,691 B2 | 11/2003 | Becker |
| 6,658,808 B1 | 12/2003 | Doherty |
| 7,197,853 B1 | 4/2007 | Little, Jr. |
| 7,596,924 B2 | 10/2009 | Sakae |
| 7,614,199 B2 | 11/2009 | Smalley, III |
| 7,665,257 B2 | 2/2010 | Posey |
| 7,677,009 B2 | 3/2010 | Bowman |
| 7,703,248 B2 | 4/2010 | Dincel |
| 7,752,817 B2 | 7/2010 | Pilz |
| 8,347,560 B2 | 1/2013 | Gyory |
| 8,413,394 B2 | 4/2013 | Pilz |
| 8,424,251 B1 | 4/2013 | Tinianov |
| 8,555,566 B2 | 10/2013 | Pilz et al. |
| 8,677,713 B1 | 3/2014 | Sheehy |
| 9,007,745 B1 | 4/2015 | Flegel |
| 9,627,863 B1 | 4/2017 | Harrison |
| 10,041,243 B2 | 8/2018 | Walker |
| 10,227,785 B2 | 3/2019 | McCaffrey |
| 10,619,347 B2 | 4/2020 | Pilz |
| D888,286 S | 6/2020 | Spear |

(Continued)

FOREIGN PATENT DOCUMENTS

| | | | |
|---|---|---|---|
| CN | 104465638 | 3/2015 | |
| CN | 106348709 A * | 1/2017 | ............. C04B 28/14 |

(Continued)

OTHER PUBLICATIONS

International Search report, dated May 16, 2023, International Application No. PCT/US 22/53216, 16 pages.
"4 Elements of Soundproofing", www.soundproofingcompany.com, 10 pages.
"Decoupling Explained", www.tmsoundproofing.com/decoupling-explained.html, 14 pages.
"Development of Lightweight Concrete Subfloor with Ethylene Vinyl Acetate (EVA) Aggregates Waste to Reduce Impact Sound Inflooring System", http://dyna.medellin.unal.edu.com, by Fernanda Pacheco et al. pp. 290-295.

(Continued)

*Primary Examiner* — Anthony J Green

(74) *Attorney, Agent, or Firm* — Haverstock & Owens, A Law Corporation

(57) ABSTRACT

A concrete composition for use in construction that is free of cement includes calcium sulfate hemihydrate (CSH), polypropylene (PP) fiber, sand, retarders, and superplasticizers. The retarders include poly condensed amino acid and calcium (Ca) salt. The superplasticizers include specially formulated polycarboxylate powder. Further, a method of using the concrete composition in one or more construction related activities (e.g., architectural applications) includes adding the concrete composition to water in a mixer, the concrete composition including CSH, PP fiber, sand, a retarder, and a superplasticizer; and blending the concrete composition with water in the mixer for a first predetermined amount of time. The method further includes mixing the concrete composition with water at a predetermined sheer in the mixer for a second predetermined amount of time. The method excludes the steps of steam curing, accelerated curing, and water curing that are used in conventional solutions.

17 Claims, 3 Drawing Sheets

(56) References Cited

U.S. PATENT DOCUMENTS

| | | | |
|---|---|---|---|
| 10,752,551 B2* | 8/2020 | Wilde | ............... C04B 28/147 |
| 10,961,710 B2 | 3/2021 | Collins et al. | |
| 11,313,121 B2 | 4/2022 | Quinjins | |
| 11,560,712 B2 | 1/2023 | Pilz | |
| 2001/0023792 A1 | 9/2001 | Noselli | |
| 2002/0020120 A1 | 2/2002 | McKenzie | |
| 2003/0196401 A1 | 10/2003 | Surowiecki | |
| 2004/0007981 A1 | 1/2004 | Shibata | |
| 2007/0056245 A1 | 3/2007 | Edmondson | |
| 2008/0053016 A1 | 3/2008 | Kang | |
| 2008/0229696 A1 | 9/2008 | Benson | |
| 2009/0051557 A1 | 2/2009 | Beatty | |
| 2010/0058686 A1 | 3/2010 | Henriquez | |
| 2010/0141153 A1 | 6/2010 | Recker | |
| 2011/0227489 A1 | 9/2011 | Huynh | |
| 2012/0162965 A1 | 6/2012 | Takeuchi | |
| 2012/0299489 A1 | 11/2012 | Sakuragi | |
| 2013/0019549 A1 | 1/2013 | Henriquez | |
| 2013/0205694 A1 | 8/2013 | Stahl, Jr. | |
| 2014/0175996 A1 | 6/2014 | Yoon | |
| 2015/0043212 A1 | 2/2015 | Coffey | |
| 2015/0275521 A1 | 10/2015 | Denmark | |
| 2015/0368898 A1 | 12/2015 | Stahl, Jr. | |
| 2016/0217957 A1 | 7/2016 | Kumar | |
| 2016/0241002 A1 | 8/2016 | Tremaine | |
| 2016/0034137 A1 | 11/2016 | Dekker | |
| 2017/0063051 A1 | 3/2017 | Sharp | |
| 2017/0089763 A1 | 3/2017 | Freer | |
| 2017/0138542 A1 | 5/2017 | Gielen | |
| 2017/0154744 A1 | 6/2017 | Hanson | |
| 2017/0169979 A1 | 6/2017 | Mittelstadt | |
| 2017/0342736 A1 | 11/2017 | Roshinsky | |
| 2018/0038103 A1 | 2/2018 | Newmayr | |
| 2018/0363893 A1 | 12/2018 | Cheng | |
| 2019/0006827 A1 | 1/2019 | Gintz | |
| 2019/0089146 A1 | 3/2019 | Li | |
| 2019/0120438 A1 | 4/2019 | Wan | |
| 2019/0166661 A1 | 5/2019 | Gao | |
| 2019/0245335 A1 | 8/2019 | McKenny | |
| 2019/0316350 A1 | 10/2019 | Pilz | |
| 2020/0119551 A1 | 4/2020 | Saylor | |
| 2022/0037861 A1 | 2/2022 | McKimmey | |

FOREIGN PATENT DOCUMENTS

| | | | | |
|---|---|---|---|---|
| CN | 106348709 A | | 1/2017 | |
| EP | 2314771 A2 | | 4/2011 | |
| GB | 2554506 A | | 4/2018 | |
| JP | 2003-293474 A | | 10/2003 | |
| WO | 2013182587 A1 | | 12/2013 | |
| WO | WO-2013182587 A1 | * | 12/2013 | ........... C04B 11/007 |
| WO | 2020014732 A1 | | 1/2020 | |

OTHER PUBLICATIONS

Cambridge Sound Management, " Explaining the Speech Privacy Potential Rating", 3 pages.

"How to Soundproof A Wall", www.bobvilla.com/articles/how-to-soundproof-a-wall/ , By: Steffani Cameron & Bob Villa, Sep. 24, 2021, 8 pages.

"Noise Isolation Class", https://asastandards.org/Terms/noise-isolation-class/, 3 pages.

"Perforated Panel Absorbers vs Diaphragmatic Absorbers", By Dennis Foley, May 19, 2013, 14 pages.

"Speech Privacy Class for Rating the Speech Privacy of Meeting Rooms", By John S. Bradley and Bradford N. Gover, vol. 36., No. 3, (2008), pp. 22-23.

Non-Final Office Action dated Feb. 25, 2020, U.S. Appl. No. 16/250,727, filed Jan. 17, 2019, applicant: Juntao Zhang, Examiner: Sememenko, Yuriy, Art Unit: 2848, 21 pages.

Notice of Allowance dated Jun. 11, 2019, U.S. Appl. No. 16/197,003, filed Jan. 20, 2018applicant: Shanfu Gao, Examiner: Le; Don P., Art Unit: 2844, 15 pages.

International Search Report dated May 18, 2022, in International Application No. PCT/US22/17555, 23 pages.

Design U.S. Appl. No. 29/727,329 for McKimmey publication U.S. Appl. No. 29/727,329 A1, (Year 2022).

* cited by examiner

CONCRETE COMPOSITION FOR USE IN CONSTRUCTION AND METHODS OF APPLYING THE SAME

FIELD OF THE INVENTION

The disclosure generally relates to concrete compositions formulated for architectural applications with high compressive and flexural strength as well as methods of using these compositions in construction related activities. In particular, the present disclosure relates to dry, cement-free (green) concrete compositions that when hydrated produce a concrete composition having high early strength, fast setting, and low thermal conductivity, and is free from shrinkage cracks.

BACKGROUND OF THE INVENTION

Builders of both commercial and non-commercial buildings are constantly looking for new innovative products in order to make buildings more environmentally friendly and energy efficient, to better protect them from the weather, and to make them more aesthetically pleasing, among other like objects.

In recent times, impacts of at least Global warming and lower ozone formation have had substantial negative impacts on the environment. Various nations across the world have drafted plans on how to address these impacts. One major factor that exacerbates these impacts has been the concretization of cities across the world. Moreover, technological advancements have resulted in cement-making companies producing higher volumes of cement compared to the past, increasing environmental harm at all stages of the concrete manufacturing process.

Therefore, new and improved concrete compositions are needed for use in construction related activities, especially, for architectural applications. The present disclosure provides such compositions as well as methods of making and using these compositions in construction activities.

SUMMARY OF THE INVENTION

Embodiments of concrete compositions and methods for manufacturing and using them in construction to address at least some of the above challenges and issues are disclosed.

In some aspects, the present disclosure is directed to a concrete composition for use in construction. The concrete composition includes calcium sulfate hemihydrate (CSH), polypropylene (PP) fiber, sand, a retarder, and a superplasticizer. The retarder includes poly condensed amino acid and calcium (Ca) salt, and the superplasticizer includes specially formulated polycarboxylate powder.

In some embodiments, amounts of one or more of: the CSH, the PP fiber, the sand, the retarder, and the superplasticizer correspond an initial setting time of the concrete composition. Further, the initial setting time corresponds to a predetermined minimum hardness rating of the concrete composition.

In some embodiments, amounts of one or more of: the CSH, the PP fiber, the sand, the retarder, and the superplasticizer correspond to a final setting time of the concrete composition. Further, the final setting time corresponds to a time when the concrete composition loses its plasticity by a predetermined amount.

In some embodiments, properties of the concrete composition include one or more of: a compressive strength of at least 50 N/mm$^2$, a flexural strength of at least 15 N/mm$^2$, an initial setting time of between 45 to 60 minutes, a fire rating of Class A1 or better, a thermal conductivity of 0.25 W/m·K or less, a predetermined range of early strengths, a predetermined range of setting times, and free from shrinkage cracks.

In some embodiments, the concrete composition further includes water in an amount such that a flowable consistency of the concrete composition is within a predetermined range. In some embodiments, the concrete composition is cement-free.

In some embodiments, the concrete composition forms one or more of: interior cladding tiles, three-dimensional (3D) panels, facades, countertops, artificial granite, and marble. In some embodiments, the combination of the CSH, the PP fiber, the sand, the retarder, and the superplasticizer, facilitates a requirement of air curing for setting of the concrete composition.

In some embodiments, the specially formulated polycarboxylate powder is a water-reducing powder additive for use in concrete and mortar.

In some embodiments, a quantity of the CSH is between 40-60% of the concrete composition by weight, a quantity of the PP fiber is between 4-5 lbs/yd$^3$, a quantity of the sand is between 30-50% of the concrete composition by weight, a quantity of the retarder is between 0.001-0.01% of the CSH by weight, and a quantity of the superplasticizer is between 0.5-2% of the CSH by weight.

In some aspects, the present disclosure is directed to a method of using concrete composition in one or more construction related activities. The method includes adding the concrete composition to water in a mixer, the concrete composition including calcium sulfate hemihydrate (CSH), polypropylene (PP) fiber, sand, a retarder, and a superplasticizer. The retarder includes poly condensed amino acid and calcium (Ca) salt, and the superplasticizer includes specially formulated polycarboxylate powder. The method further includes blending the concrete composition with water in the mixer for a first predetermined amount of time, and mixing the concrete composition with water at a predetermined sheer in the mixer for a second predetermined amount of time to produce a concrete mix having a predetermined consistency and workability. In some embodiments, the first predetermined amount of time and the second predetermined amount of time are based at least in part on a type of the mixer.

In some embodiments, the method further includes using the concrete composition to form one or more of interior cladding tiles, three-dimensional (3D) panels, facades, countertops, artificial granite, and marble. In some embodiments, the method further includes air curing the mix for a period between approximately 4 to 10 days. In some embodiments, the method includes air curing the mix for a period of approximately 7 days. In some embodiments, the method excludes one or more of steam curing, accelerated curing, and water curing.

BRIEF DESCRIPTION OF THE DRAWINGS

Further advantages of the disclosure will become apparent by reference to the detailed description of preferred embodiments when considered in conjunction with the drawings. In the drawings, identical numbers refer to the same or a similar element.

DETAILED DESCRIPTION

Figure 1:
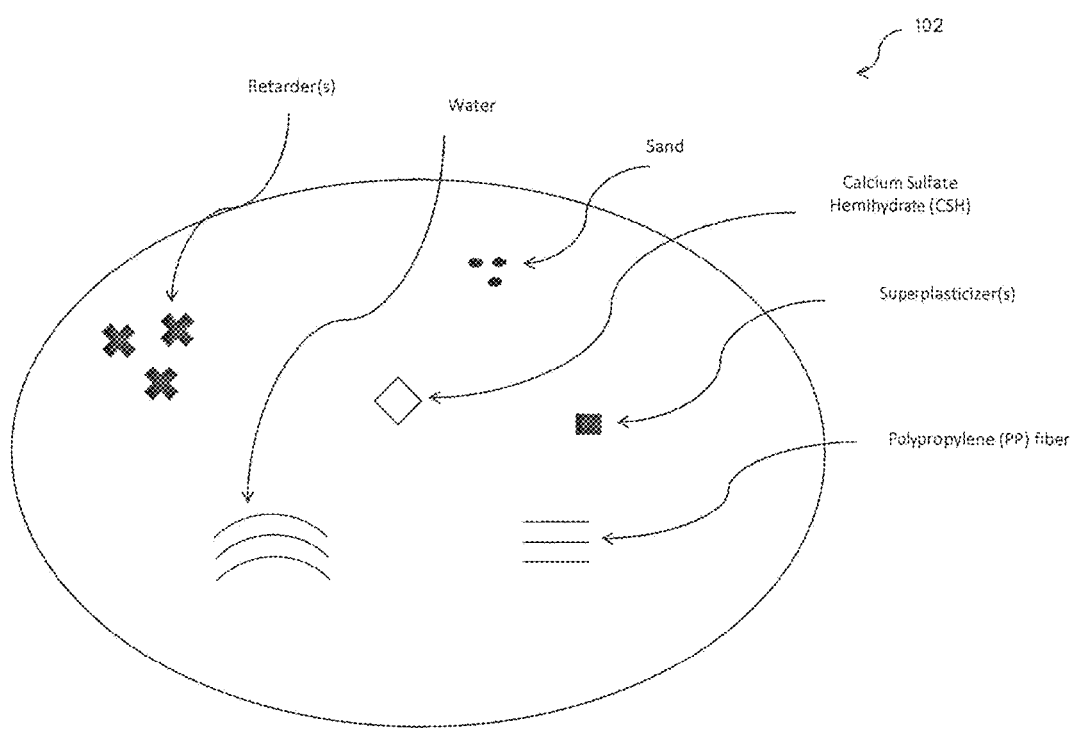
FIG. 1 illustrates ingredients collated in the form of a group that make up an exemplary concrete composition, in accordance with some embodiments of the present disclosure.

The following detailed description is presented to enable any person skilled in the art to make and use the disclosure. For purposes of explanation, specific details are set forth to provide a thorough understanding of the present disclosure. However, it will be apparent to one skilled in the art that these specific details are not required to practice the disclosure. Descriptions of specific applications are provided only as representative examples. Various modifications to the preferred embodiments will be readily apparent to one skilled in the art, and the general principles defined herein may be applied to other embodiments and applications without departing from the scope of the disclosure. The present disclosure is not intended to be limited to the embodiments shown, but is to be accorded the widest possible scope consistent with the principles and features disclosed herein.

Carbon dioxide emissions are recognized as a significant concern relating to cement production and the use of concrete as a building material. With modernization in construction-related methodologies and technologies, there has been a rapid shift from producing cement in large quantities to identifying innovative construction approaches that reduce the volume of cement production and their corresponding emissions.

The construction industry has been on the look-out for better, stronger, and more sustainable concrete. Innovative approaches are sought that can be part of a concrete composition strategy. Such innovative approaches should aim at providing sustainable environmental-friendly (e.g., substantially or entirely free of cement) concrete as a building material.

Further, innovative approaches should aim at providing advantages such as, but not limited to, reducing carbon emissions, reducing the use of natural resources for making concrete, reducing the use of water materials in concrete, and reducing air, land, and water pollution. The embodiments of the present disclosure aim to provide an improved, new, concrete composition having several advantages, some of which are listed above.

Embodiments of the present solution provide new, improved, concrete compositions (e.g., cement-free green concrete), with many advantages in architectural applications, such as high compressive strength and flexural strength. By leveraging such concrete compositions in building architectures, the present disclosure ensures high early strength, fast setting (time), elimination or reduction of shrinkage cracks, and low thermal conductivity.

Concrete compositions in accordance with the embodiments are different from plaster and mortar. This difference is based both on use as well as composition. Preferably, these concrete compositions include a specific form of calcium sulfate, i.e., calcium sulfate hemihydrate, and do not include cement. Further, these concrete compositions include retarders such as poly condensed amino acid and calcium (Ca) salt, and superplasticizers such as specially formulated polycarboxylate powder. In some embodiments, the specially formulated polycarboxylate powder includes a high-range water-reducing powder additive for use in concrete and mortar. Furthermore, these concrete compositions find use in architectural applications requiring highly compressive and flexural strength.

Further, some embodiments of the present disclosure have at least a 34% lower Global warming impact and at least a 67% lower ozone formation impact as compared to conventional solutions. Furthermore, some embodiments reduce the damage to human health and eco-systems by at least 50% as compared to conventional concrete, thereby, making them environmentally preferable solutions.

Some embodiments provide several other objects and advantages some of which are discussed below. Concrete compositions in accordance with some embodiments are highly flowable and flexible materials. Therefore, any elements with complex geometry and structure can be cast in accordance with the embodiments and requiring great surface details. Further, these concrete compositions have rapid-setting properties, enabling early demolding of precast architectural elements, resulting in improved productivity. A further significant advantage provided by these concrete compositions is their low thermal conductivity. For example, wall cladding tiles made of these concrete compositions do not allow significant heat transfer through them if installed in a house's interior wall. Such installation improves the thermal comfort inside the house by consuming less electricity. Furthermore, during manufacture, no water curing or any other form such as steam curing or accelerated curing is required other than air curing. In an example, these concrete compositions require a minimum of 7 days to achieve maximum strength through air curing alone. In addition, these concrete compositions are lighter than conventional concrete of the same grade, do not shrink, have high thermal insulation, and have high fire-resistance, among other like benefits. Using these concrete compositions, results in reduced insurance costs due to increased security and infallibility compared to structures manufactured with conventional compositions. These and other like advantages make the disclosed embodiments more environmentally friendly, economical, and sustainable.

Certain terms and phrases have been used throughout the disclosure and will have the following meanings in the context of the ongoing disclosure.

"Concrete" for the purposes of the present disclosure may refer to a hard strong building material.

"Cement" for the purposes of the present disclosure may refer to a binder, a substance that sets and hardens and can bind other materials together. Cement is manufactured through a closely controlled chemical combination of calcium, silicon, aluminum, iron, and other ingredients. Common materials used to manufacture cement may include, but are not limited to, limestone, shells, and chalk or marl combined with shale, clay, slate, blast furnace slag, silica sand, and iron ore. Some of the types of cement may include, but are not limited to, hydraulic and elite cements, such as Portland Cement, blended cements, masonry cement, oil well cement, natural cement, alumina cement, expansive cements, and the like, and mixtures thereof.

"Calcium sulfate hemihydrate" for the purposes of the present disclosure may refer to the compound $CaSO_4 \cdot \frac{1}{2}H_2O$. In the present disclosure, the abbreviation "CSH" refers to calcium sulfate hemihydrate.

"Sand" for the purposes of the present disclosure may refer to a naturally occurring granular material composed of finely divided rock and mineral particles. Sand may be defined by size in being finer than gravel and coarser than silt. The composition of sand may vary depending on the local rock sources and conditions.

"Superplasticizer" for the purposes of the present disclosure may refer to a type of chemical admixture used where a well-dispersed particle suspension is required. A superplasticizer may refer to a class of plasticizers that have fewer deleterious effects and may be used to increase workability more than is practical with traditional plasticizers. The addition of a superplasticizer to concrete allows the reduction of water content, while not affecting the workability of the mixture. Such treatment improves the strength and durability characteristics of the concrete and enables the production of self-consolidating concrete and high-performance concrete.

"Polymer" for the purposes of the present disclosure may include, but is not limited to, homopolymers, copolymers, graft copolymers, and blends and combinations thereof.

"Casting" for the purposes of the present disclosure may refer to the process in which a fluid material (i.e., the concrete mixture) is poured into a mold, which contains a hollow cavity of the desired shape, and then allowed to solidify. The solidified part is also known as a casting, which is ejected, demolded, or broken out of the mold to complete the process.

An "initial setting time" of a concrete composition refers to the time at which the concrete composition loses its plasticity and becomes hard or a workable time for concrete.

A "final setting time" of a concrete composition refers to the time required for the concrete composition to change from a plastic state to a solid state so that the concrete becomes rigid and withstands the handling stress of an architecture.

In accordance with some embodiments, the present disclosure is directed to a concrete composition for use in construction. The concrete composition may include calcium sulfate hemihydrate ($CaSO_4 \cdot \frac{1}{2}H_2O$) (CSH), polypropylene (PP) fiber, sand, a retarder, and a superplasticizer. The retarder may include at least poly condensed amino acid and calcium (Ca) salt, and the superplasticizer may include specially formulated polycarboxylate powder.

In some embodiments, the concrete composition may exhibit various properties such as, but not limited to, a compressive strength greater than or equal to 50 $N/mm^2$, a flexural strength greater than or equal to 15 $N/mm^2$, an initial setting time of between 45 to 60 minutes, a Class A1 fire rating or better, a thermal conductivity of 0.25 W/m·K or less, a predetermined range of early strengths, a predetermined range of setting times, and the elimination or reduction in the number of shrinkage cracks.

In some embodiments, the concrete composition may be available in prepacked/prepackaged form, where water is added in an amount such that a flowable consistency of the concrete composition is withing a predetermined range. In some embodiments, the concrete composition of the present disclosure is highly suitable for forming one or more of: interior cladding tiles, three-dimensional (3D) panels, facades, countertops, artificial granite, and marble.

In some embodiments, amounts of one or more of: the CSH, the PP fiber, the sand, the retarder, and the superplasticizer correspond to an initial setting time of the concrete composition, and the initial setting time corresponds to a predetermined minimum hardness rating of the concrete composition. In some embodiments, amounts of one or more of: the CSH, the PP fiber, the sand, the retarder, and the superplasticizer correspond to a final setting time of the concrete composition, and the final setting time corresponds to a time when the concrete composition loses its plasticity by a predetermined amount. Further, the concrete composition, so disclosed, may be used to obtain cement-free eco-friendly green concrete.

In some embodiments, the concrete composition, so disclosed, may be used in one or more construction activities. For such embodiments, the concrete composition may be added to water in a mixer. In some embodiments, the concrete composition may be blended in the mixer for a first predetermined amount of time at a first speed (a normal speed), where the first predetermined amount of time may be at least based on a type of the mixer. Further, in some embodiments, the concrete composition may be mixed at a predetermined sheer in the mixer for a second predetermined amount of time until a concrete mix having a predetermined consistency and workability is achieved, where the second predetermined amount of time may also be based at least on the type of the mixer.

In some embodiments, the mix is air cured for a period between approximately 4 to 10 days. In some embodiments, the mix is air cured for a period of approximately 7 days. In some embodiments, the mix is air cured for a period of not more than 7 days. It will be appreciated that other periods are contemplated.

These and other embodiments are discussed in detail below.

In some embodiments, the present disclosure relates to a concrete composition that includes calcium sulfate hemihydrate (CSH), polypropylene (PP) fiber, sand, a retarder, and a superplasticizer. In some embodiments, the retarder includes at least poly condensed amino acid and calcium (Ca) salt, and the superplasticizer includes specially formulated polycarboxylate powder. Calcium sulfate hemihydrate (CSH) for the purposes of the present disclosure refers to $CaSO_4 \cdot \frac{1}{2}H_2O$. A person of ordinary skill in the art will understand that calcium sulfate is available in many forms such as, but not limited to, calcium sulfate hemihydrate, anhydrous calcium sulfate, etc.

Preferably, some concrete compositions in accordance with the embodiments preferably include CSH because of the various advantages that it offers. For example, CSH provides a highest increase in gelation and improved final setting times of the resulting concrete mix. In some embodiments, CSH can be obtained from naturally available sources or is produced industrially. A person of ordinary skill in the art will understand that CSH is typically prepared from gypsum, i.e., calcium sulfate dihydrate. Calcium sulfate dihydrate for the purposes of the present disclosure refers to $CaSO_4 \cdot \frac{1}{2}H_2O$. Further, in an example, gypsum which is naturally available in solid form as deposits, undergoes many processes, such as (but not limited to) grinding and heating under high pressure to get the final $CaSO_4 \cdot \frac{1}{2}H_2O$ (CSH) in fine powder form in factories.

In some embodiments, a concrete composition includes CSH, where CSH is 40-60% of the concrete composition by weight. This material acts like a binder and the quality of CSH directly influences the properties such as compressive strength, flexural strength, setting time, durability, etc., of the resulting concrete. CSH may react with other fundamental components of the concrete composition, as mentioned above, to minimize or eliminate shrinkage cracks while imparting other useful properties to the disclosed concrete composition. Further, CSH provides higher compressive strengths as compared to other forms of calcium sulfate. Furthermore, use of CSH in the concrete compositions results in a preferred pH value of approximately 12 in the resulting concrete mix, though other pH values are also contemplated. In some embodiments, a blend of two or more forms of calcium sulfate is used to modify the set times and early compressive strength properties of the concrete composition as suitable for the building requirements. Early setting time is an intrinsic property of all calcium sulfates and CSHs. CSHs typically lose their plasticity within 10 minutes of being mixed with water. Thus, in some embodiments, CSH may impart longer setting times with the aid of a retarder. The compressive strength of the obtained concrete may be enhanced with CSH. All CSHs are available in the market and are of different types. The pH values of all commercially available CSHs vary. To get optimum results from the present concrete compositions, CSHs with higher pH values (pH>10) are preferable. In some embodiments, two or more CSHs are blended to obtain the required pH value in a given concrete composition.

In some embodiments, Polypropylene (PP) fiber is included as one of the components of the concrete composition. In some embodiments, the PP fiber is added in the amount of 4-5 lbs/yd$^3$. Preferably, PP fibers are added to improve the flexural strength, reduce the incidence of post-crack behaviors, and increase the fire resistance of the obtained concrete. Preferably, the addition of PP fibers results in a fire rating of at least 2 hours. A person of ordinary skill in the art will understand that polypropylene fibers may include polymer fibers, i.e., straight or deformed fragments of extruded, oriented, and cut polymer material. Polypropylene fibers are also called "structural fibers" because they are able to replace the traditional reinforcement in the form of steel bars. Moreover, the time needed to make steel reinforcement and investments costs are saved. Hence, the use of polypropylene fiber in the concrete composition makes it more economical.

The ecological and economic benefits of PP fibers are also advantageous when it comes to sustainable development. A person of ordinary skill in the art will understand that other configurations are also possible for the compositions and fibers.

Sand is another component of some embodiments of concrete compositions. Sand is used in quantities depending on the desired property such as, but not limited to, improved performance of the concrete composition, optimal concrete setting times and hardening performance, improved durability, optimal air content of the concrete composition, and other like characteristics. In some embodiments, the recommended quantity of sand in the present concrete composition is 30-50% of the concrete composition by weight. A person of ordinary skill in the art will understand that other scenarios are also possible for the same.

Retarder(s) and superplasticizer(s) are polymer components that are used in some embodiments of the present concrete composition. In some embodiments, a recommended percentage of the retarder is 0.001-0.01% by weight of binder content (CSH). In some embodiments, retarders, such as poly condensed amino acid and calcium (Ca) salt, are used in the concrete composition. Such retarders help to slow the hydration process of the concrete composition. Further, the retarders provide excellent performance on increasing the initial setting time of the concrete composition. The amounts of the retarders used depend on the type of retarder and can easily be determined by a person skilled in the art in accordance with the concrete requirements. A person of ordinary skill in the art will understand that other scenarios are also possible for the same. In some embodiments, the addition of a retarder can prolong the initial setting time. In one example, the initial setting time is between 45 to 60 minutes, though other times are also contemplated. In some embodiments, the initial setting time is customizable by adjusting the retarder dosage.

A person of ordinary skill in the art will understand that a superplasticizer refers to a chemical admixture which is used where a well-dispersed particle suspension is required. In some embodiments, a recommended percentage of the superplasticizer is 0.5-2% by weight of the binder content (CSH). The addition of such a superplasticizer allows for the reduction of water content and an increase in the flowability, while not affecting the workability of the concrete mix. Further, the addition of the superplasticizer improves the strength and durability characteristics of the concrete composition.

In some embodiments, a suitable fluidity of the concrete composition depends on a type of the plasticizer, a dosage of the plasticizer, or both. In some embodiments, the superplasticizer comprises a specially formulated polycarboxylate powder. Preferably, the polycarboxylate powder is a third-generation high-range water-reducing and superplasticizer powder additive for use in concrete and mortar. In some embodiments, this specially formulated polycarboxylate powder as a superplasticizer allows significant water reduction at a relatively low dosage, which further enables good particle dispersion. In some embodiments, the superplasticizer is used in either dry form or in the form of a solution. In some embodiments, a dry form of superplasticizer is preferable.

Preferably, concrete compositions in accordance with some embodiments are cement-free, that is, environmental-friendly green concrete. In some embodiments, these concrete compositions have high compressive strength (for example, at least 50 N/mm$^2$). For example, in some embodiments, the concrete composition includes calcium sulfate hemihydrate (CaSO$_4$·½H$_2$O) (CSH), polypropylene (PP) fiber, sand, retarder(s), and superplasticizer(s). In some embodiments, the retarder includes poly condensed amino acid and calcium (Ca) salt, and the superplasticizer includes specially formulated polycarboxylate powder. In some embodiments, a compressive strength of the concrete composition is at least 50 N/mm$^2$. Preferably, a flexural strength of the concrete composition is improved, such as increased to at least 15 N/mm$^2$.

In some embodiments, the initial setting time of the concrete composition is prolonged by an amount of time, and the concrete composition loses its plasticity and becomes hard during the initial setting time (i.e., changes from a plastic state to a solid state). In some embodiments, the initial setting time of the concrete composition is between 45 to 60 minutes, though other setting times are also contemplated.

In some embodiments, the concrete composition sets rapidly by an amount of time during the final setting time, during which the concrete composition loses its plasticity by a predetermined amount (i.e., it changes from a plastic state to a solid state). In some embodiments, the final setting time of the concrete composition ranges between 4 to 6 hours. In some embodiments, adding a retarder does not alter the final setting time for the concrete composition.

Other properties of the present concrete composition may include, but are not limited to, improved fire resistance, low thermal conductivity, high early strength, fast setting time, reduction or elimination of shrinkage cracks, and other like properties. In some embodiments, the concrete composition achieves a fire rating of at least Class A1. In some embodiments, the thermal conductivity of the concrete composition may be 0.25 W/m·K or less.

Concrete compositions in accordance with some embodiments have many applications in architecture, such as in the formation of interior cladding tiles, three-dimensional (3D) panels, facades, countertops, artificial granite, and marble, to name only a few examples.

Further, the present concrete compositions may be made available in a prepackaged form, and water is added in an amount that may be sufficient to produce concrete with a predetermined range of flowable consistency. In some embodiments, one package of the concrete composition weighs around 50 pounds (lbs). Typically, the shelf life of the concrete composition is about 6 months if stored properly, i.e., stored at an elevated place on the ground and away from moisture. In some embodiments, the unit weight of the compositions ranges from 2,100 to 2,200 kg/m$^3$. A person of ordinary skill in the art will understand that other configurations and scenarios are also possible for the compositions.

FIG. 1 illustrates ingredients collated in the form of a group 102 that make up an exemplary concrete composition, in accordance with some embodiments of the present disclosure. In some embodiments, the ingredients may include, but are not limited to, calcium sulfate hemihydrate (CSH), polypropylene (PP) fiber, sand, retarder(s), and superplasticizer(s). Further, water may be added to the ingredients when making up the concrete composition. Thus, in some embodiments, the group 102 may be used to manufacture the exemplary concrete composition.

Figure 2:
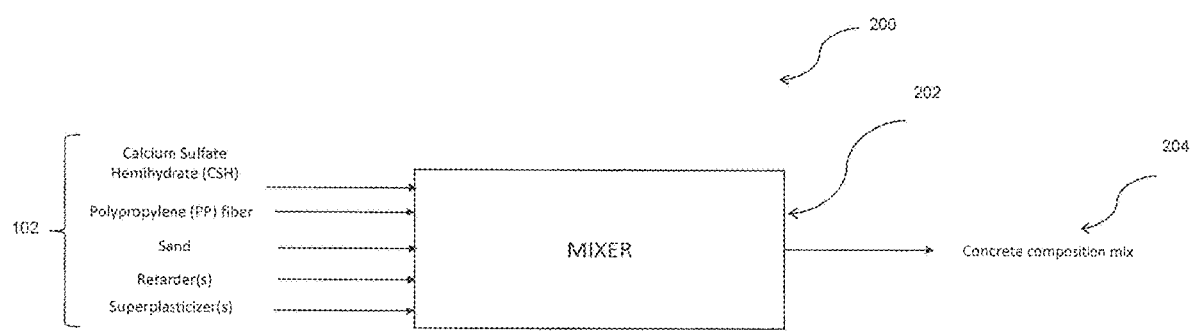
FIG. 2 illustrates an arrangement for manufacturing concrete compositions, in accordance with some embodiments of the present disclosure.

FIG. 2 illustrates an arrangement 200 for manufacturing concrete compositions, in accordance with some embodiments of the present disclosure.

The arrangement 200 includes a mixer 202 that receives as inputs ingredients 102 and produces a concrete composition mix 204. The ingredients 102 include calcium sulfate hemihydrate (CSH), polypropylene (PP) fiber, sand, retarder(s), and superplasticizer(s). In some embodiments, the retarder(s) includes poly condensed amino acid and calcium (Ca) salt, and the superplasticizer(s) includes specially formulated polycarboxylate powder. In some embodiments, all these components 102 are added in the mixer 202 with water in appropriate quantities according to the desired concrete composition. The table below (Table 1) indicates the appropriate quantities of the components of the concrete composition in accordance with some embodiments. The quantities indicated in Table 1 are non-limiting. Other ingredients and quantities are contemplated.

TABLE 1

| Component | Quantity |
| --- | --- |
| Calcium sulfate hemihydrate (CSH) | 40-60% |
| Sand | 30-50% |
| Superplasticizer | 0.5-2% of the CSH by weight |
| Retarder | 0.001-0.01 of the CSH by weight |
| PP Fiber | 4-5 lbs/yd$^3$ |
| Water | 15-20% |

A person of ordinary skill in the art will understand that a mixer blends and mixes materials to produce a resulting mix. In some embodiments, the mixer 202 includes, but is not limited to, batch mixers such as, drum type mixers and pan type mixers, and continuous mixers, which may be used for the present disclosure. A person of ordinary skill in the art will understand that other configurations are also possible for the mixer 202.

Referring to FIG. 2, once the components 102 are mixed in the mixer 202 at a normal speed for a predetermined amount of time, a consistent and workable concrete composition mix 204 (with a predetermined range of flowable consistency) is obtained that is cement-free. This consistent and workable concrete composition 204 may be used for various purposes such as, but not limited to, the production of interior cladding tiles, 3D panels, facades, countertops, artificial granite, and marble, to name only a few examples.

Figure 3:
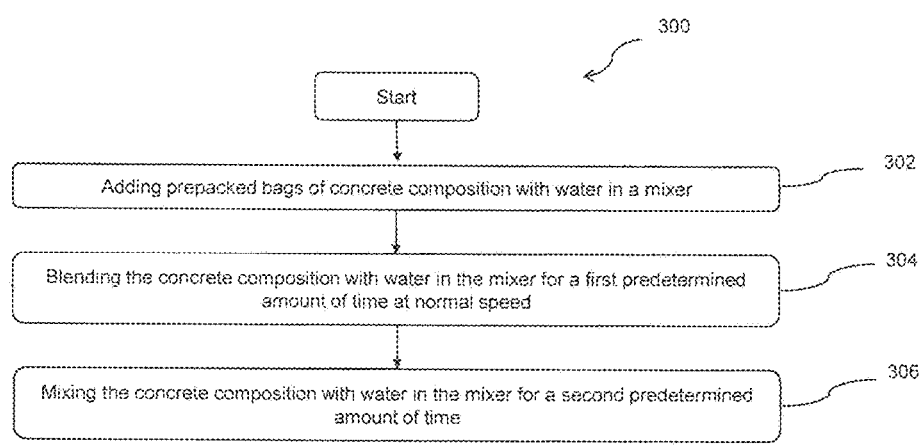
FIG. 3 illustrates the steps of a method for manufacturing concrete compositions for construction activities, in accordance with some embodiments of the present disclosure.

FIG. 3 illustrates a flowchart specifying the steps of a method 300 for manufacturing concrete compositions for construction activities, in accordance with some embodiments of the present disclosure, such as in architectural applications. The concrete composition described herein may be equivalent to the concrete composition 204 of FIG. 2 in its functionality and characteristics, as described above.

Although specific operations are disclosed herein, such operations are examples and are non-limiting. In different embodiments, to name only a few examples, the method 300 includes other steps, the sequence of the steps is modified, some steps are omitted, or any combination of these variations may be incorporated. The steps of the method 300 may be automated or semi-automated. In various embodiments, one or more of the operations of the method 300 may be controlled or managed by software, by firmware, by hardware, or by any combination thereof, but is not limited to such.

In some embodiments, the method 300 includes processes in accordance with the present disclosure which may be controlled or managed by a processor(s) and electrical components under the control of a computer or computing device comprising computer-readable media containing non-transitory computer-executable instructions or code that when executed by the processor(s) perform the steps of the method 300. The readable and executable instructions (or code) may reside, for example, in data storage such as volatile memory, non-volatile memory, and/or mass data storage, as only some examples. In some embodiments, automation of the method 300 through a computer employs various peripherals such as sensors, robotic arms, etc.

Referring to FIG. 3, at a step 302, prepacked bags of concrete composition are added to water (for example, in a predetermined amount) in a mixer (for example, mixer 202 of FIG. 2). In some embodiments, the concrete composition includes calcium sulfate hemihydrate (CSH), polypropylene (PP) fiber, sand, retarders, and superplasticizers. In some embodiments, the retarders include poly condensed amino acid and calcium (Ca) salt, and the superplasticizers include specially formulated polycarboxylate powder.

Next, at a step 304, the concrete composition is blended with water in the mixer at a normal speed for a first predetermined amount of time. In some embodiments, the first predetermined amount of time for which the concrete composition is blended with water may vary from 2 to 3 minutes, though other times are contemplated. In some embodiments, the first predetermined amount of time for which the concrete composition is blended may be based at least on a type of the mixer used for such purpose.

Next, at a step 306, the concrete composition is mixed with water in the mixer at high sheer (for example, a predetermined sheer) for a second predetermined amount of time until a workable and consistent mix (for example, concrete composition mix 204 of FIG. 2) is achieved. Initially, the concrete composition is in powder form, so a slower speed (normal speed) is adequate to blend all ingredients homogeneously. After water is added, the concrete composition turns to paste, and its viscosity increases. In step 306, the high shear mixing is performed to get a workable consistency. In some embodiments, the second predetermined amount of time equals or exceeds the first predetermined amount of time. In some embodiments, the first predetermined amount of time may or may not be the same as the second predetermined amount of time. In some embodiments, the second predetermined amount of time may vary from 3 to 5 minutes. In some embodiments, the second predetermined amount is based at least on the type of mixer used for such purpose.

In some embodiments, the method 300 may not require (excludes) one or more of: steam curing or accelerated curing or water curing. Preferably, the method 300 includes air curing for a predetermined period of time. In some embodiments, air curing is sufficient. In some embodiments, air curing includes keeping the concrete composition in a packed form in a stockyard without any treatment. In some embodiments, preferably, air curing of the final architectural product is performed for a period between 4 to 10 days. In some embodiments, air curing of the final architectural product is performed for approximately 7 days, to ensure that elements (included in the concrete composition) are not installed at the site before this time. In some embodiments, the design compressive strength of 50 N/mm$^2$ (of the concrete composition) may be achieved in approximately 7 days. In such a scenario, the curing process may be terminated after obtaining the desired compressive strength. As such, in some embodiments, air curing is required for only 7 days. In accordance with some embodiments, because concrete composition achieves total design strength in approximately 7 days, air curing for additional days (e.g., 14 days) is unnecessary. In some embodiments, the air curing of the final architectural product is performed for not more than 7 days. In some embodiments, one or more of steam curing, accelerated curing, and water curing are excluded from the manufacturing process.

Embodiments of the concrete composition and the methods of making and using them provide an environmentally friendly architectural product. Mixes of concrete compositions in accordance with some embodiments do not contain cement or any cementitious binder, and thus, are green materials. Conventional cement-based mixture compositions undergo a curing process for strength development and durability. However, concrete compositions in accordance with some embodiments do not require any kind of curing, and in preferred embodiments only air curing is performed. In some embodiments the curing excludes each of steam curing, accelerated curing, and water curing. In some embodiments, the mixes include calcium sulfate, preferably as CSH. Furthermore, conventional cement-based concrete tends to shrink and crack. However, concrete in accordance with some embodiments is cement-free, and thus, free from shrinkage and cracks.

In some embodiments, a system (in an example, a computer) for performing the steps of method 300 is automated. Preferably, the computer may comprise a memory storing computer-executable instructions that when executed by a processor(s) perform the steps of method 300.

The terms "comprising," "including," and "having," as used in the specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may,"and similar terms are used to indicate that an item, condition, or step being referred to is an optional (not required) feature of the invention. The term "connecting" includes connecting, either directly or indirectly, and "coupling," including through intermediate elements.

The disclosure has been described with reference to various specific and preferred embodiments and techniques. However, it should be understood that many variations and modifications may be made while remaining within the spirit and scope of the disclosure. It will be apparent to one of ordinary skill in the art that methods, devices, device elements, materials, procedures, and techniques other than those specifically described herein can be applied to the practice of the disclosure as broadly disclosed herein without resort to undue experimentation. All art-known functional equivalents of methods, devices, device elements, materials, procedures, and techniques described herein are intended to be encompassed by this disclosure. Whenever a range is disclosed, all subranges and individual values are intended to be encompassed. This invention is not to be limited by the embodiments disclosed, including any shown in the drawings or exemplified in the specification, which are given by way of example and not of limitation. Additionally, it should be understood that the various embodiments of the building blocks described herein contain optional features that can be individually or together applied to any other embodiment shown or contemplated here to be mixed and matched with the features of that building block.

While the disclosure has been described with respect to a limited number of embodiments, those skilled in the art, having benefit of this disclosure, will appreciate that other embodiments can be devised which do not depart from the spirit and scope of the disclosure as disclosed herein.

I claim:

1. A concrete composition for use in construction, comprising:
   calcium sulfate hemihydrate (CSH), a quantity of the CSH is between 40-60% of the concrete composition by weight;
   polypropylene (PP) fiber, a quantity of the PP fiber is between 4-5 lb/yd$^3$;
   sand, a quantity of the sand is between 30-50% of the concrete composition by weight;
   a retarder comprising poly condensed amino acid and calcium (Ca) salt, a quantity of the retarder is between 0.001-0.01% of the CSH by weight; and
   a superplasticizer comprising polycarboxylate powder, a quantity of the superplasticizer is between 0.5-2% of the CSH by weight.

2. The concrete composition of claim 1, wherein amounts of one or more of: the CSH, the PP fiber, the sand, the retarder, and the superplasticizer correspond to an initial setting time of the concrete composition, and wherein the initial setting time corresponds to a minimum hardness rating of the concrete composition.

3. The concrete composition of claim 1, wherein amounts of one or more of: the CSH, the PP fiber, the sand, the retarder, and the superplasticizer correspond to a final setting time of the concrete composition, and wherein the final setting time corresponds to a time when the concrete composition loses its plasticity by a first amount.

4. The concrete composition of claim 1, wherein properties of the concrete composition comprise one or more of:
   a compressive strength of at least 50 N/mm$^2$;
   a flexural strength of at least 15 N/mm$^2$;
   an initial setting time of between 45 to 60 minutes;

a fire rating of Class A1 or better;
a thermal conductivity of 0.25 W/m·K or less;
a range of early strengths;
a range of setting times; and
free from shrinkage cracks.

5. The concrete composition of claim 1, further comprising water in an amount such that a flowable consistency of the concrete composition is within a workable range.

6. The concrete composition of claim 1, wherein the concrete composition is cement-free.

7. The concrete composition of claim 1, wherein the specially formulated polycarboxylate powder is a water-reducing powder additive for use in concrete and mortar.

8. A method of using concrete composition in one or more construction activities, the method comprising:
    adding the concrete composition to water in a mixer, wherein the concrete composition comprises from 40 to 60 wt. % of calcium sulfate hemihydrate (CSH), from 4 to 5 lbs/yd$^3$ of polypropylene (PP) fiber, from 30 to 50 wt. % of sand, a retarder, and a superplasticizer, wherein the retarder comprises poly condensed amino acid and calcium (Ca) salt and a quantity of the retarder is between 0.001-0.01% of the CSH by weight, and wherein the superplasticizer comprises polycarboxylate powder and a quantity of the superplasticizer is between 0.5-2% of the CSH by weight;
    blending the concrete composition with water in the mixer for a first amount of time; and
    mixing the concrete composition with water in the mixer for a second amount of time to produce a concrete mix having a workable consistency.

9. The method of claim 8, wherein amounts of one or more of: the CSH, the PP fibers, the sand, the retarder, and the superplasticizer correspond to an initial setting time of the concrete composition, wherein the initial setting time corresponds to a minimum hardness rating of the concrete composition, and wherein during the initial setting time, the concrete composition changes from a plastic state to a solid state.

10. The method of claim 8, wherein amounts of one or more of: the CSH, the PP fiber, the sand, the retarder, and the superplasticizer correspond to a final setting time of the concrete composition, and wherein the final setting time corresponds to a time when the concrete composition loses its plasticity by a first amount.

11. The method of claim 8, wherein properties of the concrete composition comprise one or more of:
    a compressive strength of at least 50 N/mm$^2$;
    a flexural strength of at least 15 N/mm$^2$;
    an initial setting time between 45 to 60 minutes;
    a fire rating of Class A1 or better;
    a thermal conductivity of 0.25 W/m·K or less;
    a range of early strengths;
    a range of setting times; and
    free from shrinkage cracks.

12. The method of claim 8, wherein water is added to the concrete composition in an amount such that a flowable consistency of the concrete composition is within a workable range.

13. The method of claim 8, wherein the concrete composition is cement-free.

14. The method of claim 8, further comprising air curing the mix for a period between approximately 4 to 10 days.

15. The method of claim 8, further comprising air curing the mix for a period of approximately 7 days.

16. The method of claim 8, wherein the first amount of time and the second amount of time are based at least in part on a type of the mixer.

17. The method of claim 8, excludes each of steam curing, accelerated curing, and water curing.

\* \* \* \* \*